US008650400B2

(12) United States Patent
Kitagawa

(10) Patent No.: US 8,650,400 B2
(45) Date of Patent: Feb. 11, 2014

(54) DATA PROCESSOR, RELAY TRANSMITTER, AND DATA TRANSMISSION SYSTEM

(75) Inventor: Isamu Kitagawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 827 days.

(21) Appl. No.: 12/731,463

(22) Filed: Mar. 25, 2010

(65) Prior Publication Data

US 2010/0250940 A1    Sep. 30, 2010

(30) Foreign Application Priority Data

Mar. 31, 2009  (JP) .................. 2009-085993

(51) Int. Cl.
*H04L 9/32* (2006.01)
*H04K 1/00* (2006.01)

(52) U.S. Cl.
USPC ............. 713/171; 713/189; 380/270

(58) Field of Classification Search
USPC ....... 713/171; 726/5; 380/243, 270; 358/407; 455/7
See application file for complete search history.

(56) References Cited

U.S. PATENT DOCUMENTS

| 7,455,229 | B2 * | 11/2008 | Tanaka ................... 235/462.01 |
| 7,742,742 | B2 | 6/2010 | Watanabe et al. |
| 8,165,141 | B2 | 4/2012 | Balgard et al. |
| 2003/0065952 | A1 | 4/2003 | Otsuka |
| 2005/0059342 | A1 | 3/2005 | Engels et al. |
| 2005/0125682 | A1 * | 6/2005 | Eguchi ................... 713/189 |
| 2006/0039332 | A1 | 2/2006 | Kotzin |
| 2006/0246941 | A1 | 11/2006 | Watanabe et al. |
| 2007/0086394 | A1 | 4/2007 | Yamada et al. |
| 2007/0147815 | A1 | 6/2007 | Tanaka |
| 2007/0244963 | A1 | 10/2007 | Hibino et al. |
| 2008/0002614 | A1 | 1/2008 | Hanabusa et al. |
| 2008/0176596 | A1 | 7/2008 | Jung et al. |
| 2008/0182570 | A1 | 7/2008 | Kuhl |

(Continued)

FOREIGN PATENT DOCUMENTS

CN    101330427 A    12/2008
EP    1 404 106 A2    3/2004

(Continued)

OTHER PUBLICATIONS

Search Report and Search Opinion dated Apr. 18, 2012 received from the European Patent Office from related European Application No. 10003161.6.

(Continued)

*Primary Examiner* — Saleh Najjar
*Assistant Examiner* — Shu Chun Gao
(74) *Attorney, Agent, or Firm* — Scully, Scott, Murphy & Presser, P.C.

(57) ABSTRACT

A data processor is configured to perform wireless communication with a relay transmitter, store a first physical address for the relay transmitter on a storage unit, receive a second physical address for the relay transmitter from the relay transmitter after the data processor being turned on, determine whether the second physical address for the relay transmitter is identical to the first physical address for the relay transmitter, and, when one or more authentication requirements is satisfied, establish wireless connection with the relay transmitter so as to achieve the data communication with an external device via the wireless communication with the relay transmitter. The authentication requirement includes the determination that the second physical address for the relay transmitter is identical to the first physical address for the relay transmitter.

20 Claims, 5 Drawing Sheets

(56) References Cited

U.S. PATENT DOCUMENTS

| | | |
|---|---|---|
| 2008/0244097 A1* | 10/2008 | Candelore et al. ............ 710/5 |
| 2008/0313698 A1 | 12/2008 | Zhao et al. |
| 2009/0158148 A1 | 6/2009 | Vellanki et al. |
| 2009/0224906 A1 | 9/2009 | Balgard et al. |
| 2010/0067442 A1 | 3/2010 | Van der Wal et al. |
| 2011/0222465 A1 | 9/2011 | Arashin et al. |
| 2011/0310798 A1 | 12/2011 | Hatano et al. |
| 2012/0051272 A1 | 3/2012 | Jain et al. |

FOREIGN PATENT DOCUMENTS

| | | |
|---|---|---|
| JP | 2005-142792 | 6/2005 |
| JP | 2006-311137 | 11/2006 |
| JP | 2007-116474 A | 5/2007 |
| JP | 2008-182439 | 8/2008 |
| JP | 2008-278522 | 11/2008 |
| JP | 2009-088750 | 4/2009 |
| WO | WO 02/28022 A2 | 4/2002 |

OTHER PUBLICATIONS

Notification of Reasons for Rejection dated Apr. 24, 2012 received from the Japanese Patent Office in related JP 2010-143793 corresponding to U.S. Appl. No. 13/168,397.

Office Action dated Jun. 14, 2012 received from the Chinese Patent Office from related Chinese Appl. No. 201010158183.1, together with an English-language translation.

United States Official Action dated Jul. 26, 2013 from related U.S. Appl. No. 13/168,397.

* cited by examiner

DATA PROCESSOR, RELAY TRANSMITTER, AND DATA TRANSMISSION SYSTEM

CROSS-REFERENCE TO RELATED APPLICATION

This application claims priority under 35 U.S.C. §119 from Japanese Patent Application No. 2009-085993 filed on Mar. 31, 2009. The entire subject matter of the application is incorporated herein by reference.

BACKGROUND

1. Technical Field

The following description relates to one or more image transmitting techniques.

2. Related Art

So far, a technique has been proposed in which data communication can be performed between wireless communication devices after authentication is achieved therebetween via wireless communication. In such a technique, for example, when a user attaches a lens unit to a camera main body, wired connection is established between the camera main body and the lens unit. Thereby, the camera main body and the lens unit can communicate with each other.

At that time, each of the camera main body and the lens unit acquires an authenticator, an ID, a MAC address, an IP address from the other, and stores these pieces of information onto a non-volatile memory thereof. After a series of processes as described above, the camera main body and the lens unit can perform wireless communication with each other.

Specifically, to establish wireless connection between the camera main body and the lens unit, the camera main body first displays, on an LCD thereof, a list of all lens unit IDs. After the list is displayed, when the user operates an operation key to select one of lens units corresponding to the lens unit IDs displayed, the camera main body reads out an authenticator of the selected lens unit from the non-volatile memory.

Then, the camera main body issues, to the selected lens unit, a connection request that includes the read authenticator, the MAC address of the camera main body, and the lens unit ID. On the other hand, the lens unit receives the connection request from the camera main body and determines whether the lens unit ID thereof is identical to the lens unit ID included in the received connection request.

As a result, when determining that the lens unit ID thereof is identical to the lens unit ID included in the received connection request, the lens unit reads, out of the non-volatile memory thereof, a main body ID and an authenticator that correspond to the received MAC address of the camera main body. Then, the lens unit determines whether the read main body ID and authenticator are identical to those included in the received connection request.

When determining that the read main body ID and authenticator are identical to those included in the received connection request, the lens unit transmits a response "OK" to the camera main body. After that, the lens unit can be operated from the side of the camera main body via wireless communication using the IP addresses previously exchanged therebetween.

SUMMARY

In the meantime, in a conventional multi-function peripheral (MFP) or a conventional facsimile machine, a unit that performs communication with other facsimile machines and a unit that inputs or outputs images (e.g., reads, prints, or displays images) are incorporated in a single housing. In such an integrated device, when accepting initial default settings, a user can generally perform facsimile communication merely by turning on the device.

Meanwhile, according to an image transmission system in which a unit that communicates with other facsimile machines and a unit that inputs or outputs images are incorporated in respective different housings and perform data transmission therebetween via wireless communication, unlike the aforementioned integrated device, a user cannot perform facsimile communication until the two units are wirelessly connected with each other even after the two units are turned on.

However, for instance, in the case of the aforementioned technique for wireless connection between the camera main body and the lens unit, the wireless connection is not established therebetween until the user attaches the lens unit to the camera main body.

In other words, the technique does not make it possible to establish the wireless connection between the camera main body and the lens unit merely by turning on the camera main body and the lens unit just after purchasing the camera main body and the lens unit. Therefore, unfortunately, even though the technique is applied to the aforementioned image transmission system configured with the separate units, it is difficult to attain the same operability and user-friendliness as the aforementioned integrated device.

Aspects of the present invention are advantageous to provide one or more improved techniques that make it possible to establish wireless connection between devices merely by turning on the devices.

According to aspects of the present invention, a data processor is provided that is configured to perform data communication with an external device via wireless communication with a relay transmitter. The data processor includes a communication unit configured to perform wireless communication with the relay transmitter, a storage unit configured to store a first physical address for the relay transmitter, an authentication starter configured to, in response to the data processor being turned on, transmit, to the relay transmitter, an instruction to start authentication between the data processor and the relay transmitter along with a physical address for the data processor, an address receiver configured to receive a second physical address for the relay transmitter from the relay transmitter as a response to the instruction, a determining unit configured to make a determination as to whether the second physical address for the relay transmitter is identical to the first physical address for the relay transmitter, and a connecting unit configured to, when one or more authentication requirements are satisfied, establish wireless connection between the communication unit and the relay transmitter so as to achieve the data communication between the data processor and the external device via the relay transmitter, the authentication requirements including the determination by the determining unit that the second physical address for the relay transmitter is identical to the first physical address for the relay transmitter.

According to aspects of the present invention, further provided is a relay transmitter, which includes a first communication unit configured to perform wireless communication with an data processor, a second communication unit configured to perform data communication with an external device, a storage unit configured to store a first physical address for the data processor, an address receiver configured to, in response to the relay transmitter being turned on, receive, from the data processor, a second physical address for the data processor along with an instruction to start authentication between the data processor and the relay transmitter, a determining unit configured to, in response to the instruction from the data processor, make a determination as to whether the second physical address for the data processor is identical to the first physical address for the data processor, and a connecting unit configured to, when one or more authentication requirements are satisfied, transmit a physical address for the relay transmitter to the data processor and establish wireless connection between the first communication unit and the data processor so as to achieve data communication between the data processor and the external device via the relay transmitter, the authentication requirements including the determination by the determining unit that the second physical address for the data processor is identical to the first physical address for the data processor.

According to aspects of the present invention, further provided is a data transmission system, which includes a relay transmitter configured to perform data communication with an external device, and an data processor configured to perform data communication with the external device via wireless communication with the relay transmitter. The data processor includes a communication unit configured to perform wireless communication with the relay transmitter, a storage unit configured to store a first physical address for the relay transmitter, an authentication starter configured to, in response to the data processor being turned on, transmit, to the relay transmitter, an instruction to start authentication between the data processor and the relay transmitter along with a physical address for the data processor, an address receiver configured to receive a second physical address for the relay transmitter from the relay transmitter as a response to the instruction, a determining unit configured to make a determination as to whether the second physical address for the relay transmitter is identical to the first physical address for the relay transmitter, and a connecting unit configured to, when one or more authentication requirements are satisfied, establish wireless connection between the communication unit and the relay transmitter so as to achieve the data communication between the data processor and the external device via the relay transmitter, the authentication requirements including the determination by the determining unit that the second physical address for the relay transmitter is identical to the first physical address for the relay transmitter. The relay transmitter includes a first relay-transmitter-side communication unit configured to perform wireless communication with the data processor, a second relay-transmitter-side communication unit configured to perform data communication with the external device, a relay-transmitter-side storage unit configured to store a first physical address for the data processor, a relay-transmitter-side address receiver configured to, in response to the relay transmitter being turned on, receive, from the data processor, a second physical address for the data processor along with the instruction to start authentication between the data processor and the relay transmitter, a relay-transmitter-side determining unit configured to, in response to the instruction from the data processor, make a determination as to whether the second physical address for the data processor is identical to the first physical address for the data processor, and a relay-transmitter-side connecting unit configured to, when the authentication requirements are satisfied, transmit a physical address for the relay transmitter to the data processor and establish wireless connection between the first communication unit and the data processor so as to achieve the data communication between the data processor and the external device via the relay transmitter, the authentication requirements including the determination by the relay-transmitter-side determining unit that the second physical address for the data processor is identical to the first physical address for the data processor.

In some aspects of the present invention, the physical address for the data processor may be employed for uniquely identifying a wireless communication interface (hardware for wireless communication) of the data processor on a wireless network containing thereon the data processor and the relay transmitter. In the same manner, the physical address for the relay transmitter may be employed for uniquely identifying a wireless communication interface (hardware for wireless communication) of the relay transmitter on the wireless network.

As a typical example of such a physical address, a media access control (MAC) address is cited. Nevertheless, a different physical address from the MAC address may be used depending on an applied communication standard (e.g., Bluetooth (trademark registered)).

In general, such a physical address is previously assigned as a unique address to an individual wireless communication interface, and stored on a non-volatile memory of the wireless communication interface. In some aspects of the present invention, however, each of the data processor and the relay transmitter may have a non-volatile storage unit separate from the non-volatile memory of the wireless communication interface thereof. On the non-volatile storage unit, stored is the physical address assigned to the wireless communication interface of the other device (i.e., a communication target device).

BRIEF DESCRIPTION OF THE ACCOMPANYING DRAWINGS

FIGS. 1A and 1B exemplify respective overall network configurations each of which includes an image transmission system and an external device in an embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiments according to aspects of the present invention will be described with reference to the accompany drawings.

[Overall Configuration of Image Transmission System]

Figure 1A:
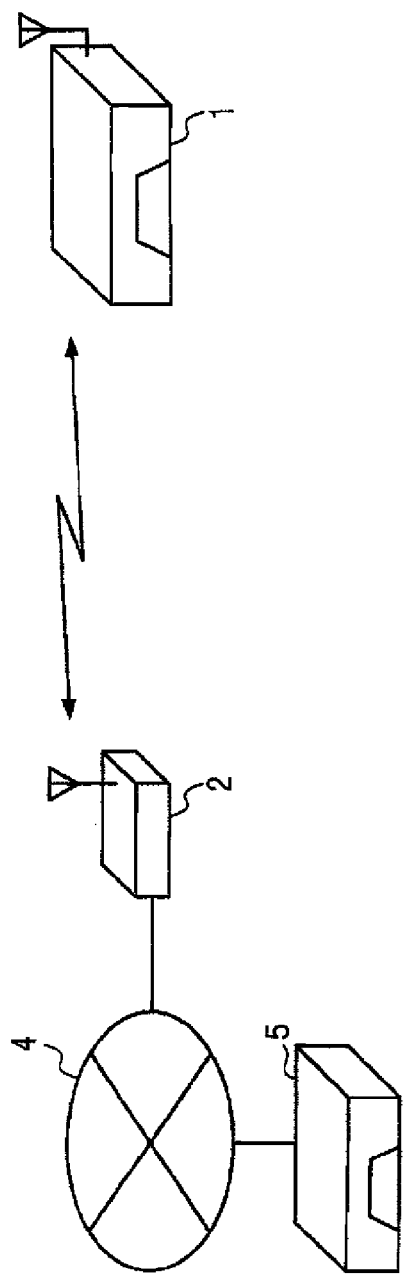
Figure 1B:
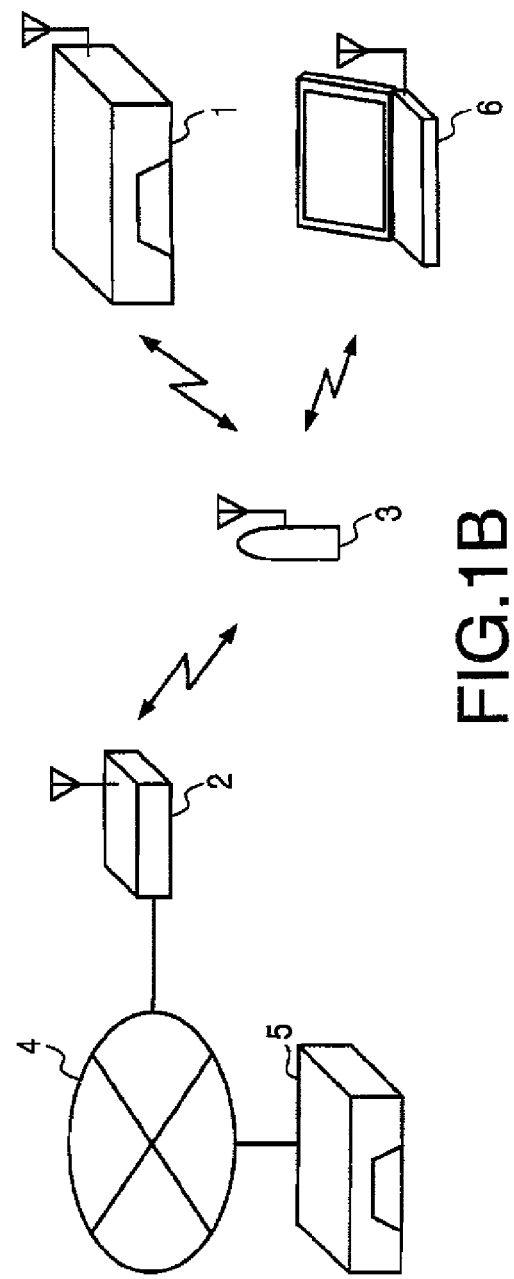

As illustrated in FIGS. 1A and 1B, an image transmission system in the embodiment, which is configured to transmit and receive images via facsimile communication, includes an image processor 1 and a relay transmitter 2. As shown in FIG. 1A, the image processor 1 and the relay transmitter 2 can perform direct wireless communication with each other. Further, as shown in FIG. 1B, when the image transmission system has an access point 3, the image processor 1 and the relay transmitter 2 can perform indirect wireless communication via the access point 3. In addition, via the relay transmitter 2 which is connected with a public switched telephone networks (PSTN) 4, the image processor 1 can communicate with an external facsimile machine 5 outside the image transmission system. Furthermore, when performing communication via the access point 3, as shown in FIG. 1B, the image processor 1 can communicate with a wireless communication device 6 other than the relay transmitter 2.

Figure 2A:
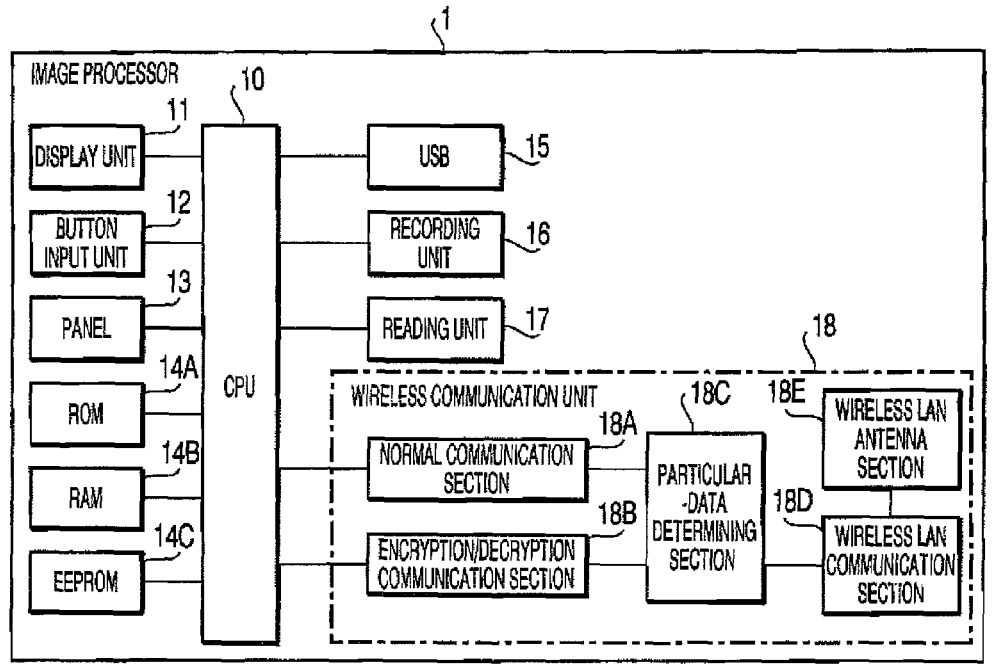
FIG. 2A is a block diagram schematically showing a configuration of an image processor in the embodiment according to one or more aspects of the present invention.

As illustrated in FIG. 2A, the image processor 1 includes a CPU 10, a display unit 11, a button input unit 12, a panel 13, a ROM 14A, a RAM 14B, an EEPROM 14C, a USB interface 15, a recording unit 16, a reading unit 17, and a wireless communication unit 18. Among the above elements, the display unit 11, the button input unit 12, the panel 13, the ROM 14A, the RAM 14B, the EEPROM 14C, the USB interface 15, the recording unit 16, the reading unit 17 are substantially the same as those of a general MFP.

The CPU 10 is configured to control each element of the image processor 1 in accordance with a control program stored on the ROM 14A. The display unit 11 is provided with a liquid crystal display (LCD) and configured to display various kinds of information. For example, the display unit 11 is utilized to display a received facsimile image without printing the image. The button input unit 12 and the panel 13 are utilized when a user performs an input operation therethrough to use various functions of the image processor 1.

The ROM 14A stores information that is not required to be rewritten, such as a program for controlling the image processor 1. The RAM 14B stores data that causes no problem even though disappearing in response to the image processor 1 being turned off. The EEPROM 14C stores various setting data that is required to remain even when the image processor 1 is turned off. The USB interface 15 is an input/output (I/O) interface to be utilized when a device complying with the USB standard is connected with the image processor 1.

The recording unit 16 is provided with a printing mechanism using an inkjet method or an electrophotographic method and configured to form an image on a sheet in a printer function, a copy function, or a facsimile receiving function. The reading unit 17 is provided with an image sensor and an automatic document feeder (ADF) and configured to optically read an image from a document sheet in a scanner function, the copy function, or a facsimile transmitting function.

The image processor 1 has the wireless communication unit 18, for performing wireless communication with the relay transmitter 2, which is not included in a general MFP. Specifically, a general MFP has been known that includes a wireless communication unit connectable with a wireless network. However, the wireless communication unit 18 of the image processor 1 is not only connectable with a wireless network but adapted to perform wireless communication with the relay transmitter 2. In this respect, the image processor 1 is different from the general MFP which does not support a device corresponding to the relay transmitter 2.

More specifically, the wireless communication unit 18 includes a normal communication section 18A, an encryption/decryption communication section 18B, a particular-data determining section 18C, a wireless LAN communication section 18D, and a wireless LAN antenna section 18E.

The normal communication section 18A generates transmission data to be transmitted in a normal procedure or analyzes received data that has been transmitted in a normal procedure, before the image processor 1 is ready to perform encrypted communication with the relay transmitter 2, or when the image processor 1 attempts to communicate with a device (e.g., the wireless communication device 6) other than the relay transmitter 2.

The encryption/decryption communication section 18B encrypts data in an encryption method specific to the image processor 1 and the relay transmitter 2, or decrypts or analyzes received data that has been transmitted in a state encrypted in an encryption method specific to the image processor 1 and the relay transmitter 2, when the image processor 1 attempts to communicate with the relay transmitter 2 after being ready to perform encrypted communication with the relay transmitter 2.

The particular-data determining section 18C transmits data to the wireless LAN communication section 18D with a flag set in the data, which flag represents through which section, between the normal communication section 18A and the encryption/decryption communication section 18B, data is transmitted. Further, when receiving data, the particular-data determining section 18C sorts the received data into one of the normal communication section 18A and the encryption/decryption communication section 18B, based on a flag in the received data.

In the embodiment, the wireless LAN communication section 18D complies with a wireless LAN standard (e.g., IEEE802.11 standards such as IEEE802.11a, IEEE802.11b, and IEEE802.11g), and is configured to switch a communication mode of the image processor 1 between an infrastructure mode and an ad hoc mode.

When switching the communication mode to the ad hoc mode, as illustrated in FIG. 1A, the image processor 1 can communicate directly with the relay transmitter 2 by establishing wireless connection with the relay transmitter 2. Further, when switching the communication mode to the infrastructure mode, as illustrated in FIG. 1B, the image processor 1 can communicate with the relay transmitter 2 or devices other than the relay transmitter 2 (e.g., the wireless communication device 6) via the access point 3 by establishing wireless connection with the access point 3.

In addition, the wireless LAN communication section 18D has a physical address (MAC address) assigned thereto that is used for wireless communication. The physical address is stored on a non-volatile memory (not shown) incorporated in the wireless LAN communication section 18D. The physical address corresponds to the image processor 1.

Figure 2B:
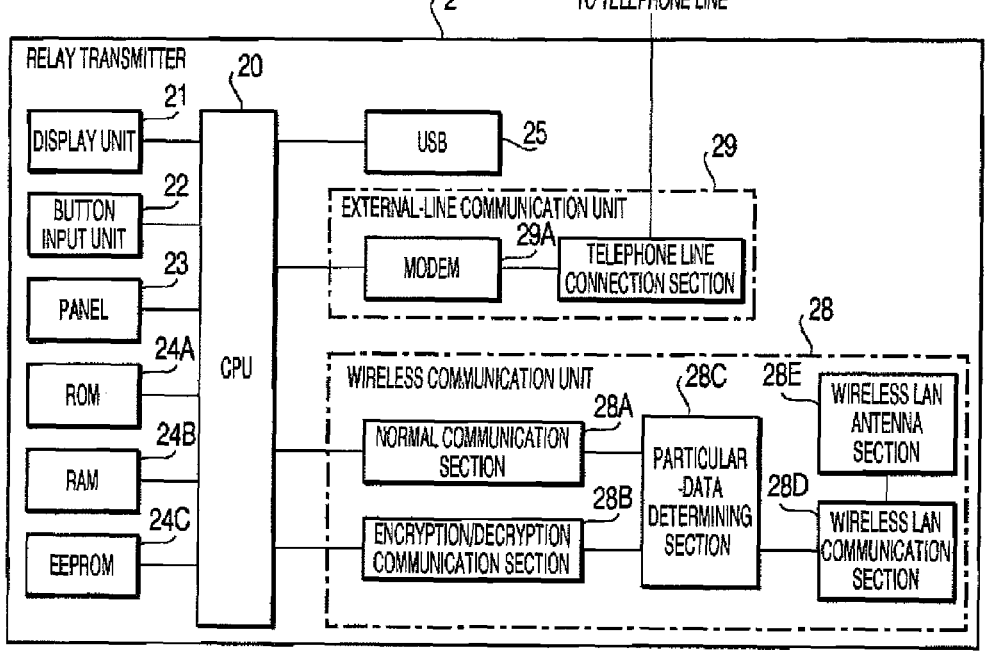
FIG. 2B is a block diagram schematically showing a configuration of a relay transmitter in the embodiment according to one or more aspects of the present invention.

On the other hand, as illustrated in FIG. 2B, the relay transmitter 2 includes a CPU 20, a display unit 21, a button input unit 22, a panel 23, a ROM 24A, a RAM 24B, an EEPROM 24C, a USB interface 25, a wireless communication unit 28, and an external-line communication unit 29.

The CPU 20 controls each element included in the relay transmitter 2 in accordance with a control program stored on the ROM 24A. The display unit 21 is provided with a liquid crystal display and configured to display various kinds of information. For example, the display unit 21 is utilized for displaying incoming and outgoing call registers. Further, the button input unit 22 and the panel are utilized for the user to perforin input operations therethrough to use functions of the relay transmitter 2.

The ROM 24A stores information that is not required to be rewritten, such as a program for controlling the relay transmitter 2. The RAM 24B stores data that would cause no problem even though disappearing when the relay transmitter 2 is turned off. The EEPROM 24C stores various kinds of setting data that is desired to remain even though the relay transmitter 2 is turned off. In the embodiment, the aforementioned physical address for the image processor 1 is stored on the EEPROM 24C as well. It is noted that, for example, the physical address for the image processor 1 may be stored on the EEPROM 24C as a factory default setting. Alternatively, the physical address for the image processor 1 may be stored before supplied to the user after set in some way (e.g., by a service person). The USB interface 25 is an input/output (I/O) interface to be utilized when a device complying with the USB standard is connected with the relay transmitter 2.

The wireless communication unit 28 is provided for wireless communication with the image processor 1. In the same manner as the image processor 1, the wireless communication unit 28 includes a normal communication section 28A, an encryption/decryption communication section 28B, an particular-data determining section 28C, a wireless LAN communication section 28D, and a wireless LAN antenna section 28E.

The normal communication section 28A generates transmission data to be transmitted in a normal procedure or analyzes received data that has been transmitted in a normal procedure, when the relay transmitter 2 attempts to communicate with the image processor 1 before being ready to perform encrypted communication with the image processor 1.

The encryption/decryption communication section 28B encrypts data in an encryption method specific to the image processor 1 and the relay transmitter 2, or decrypts or analyzes received data that has been transmitted in a state encrypted in an encryption method specific to the image processor 1 and the relay transmitter 2, when the relay transmitter 2 attempts to communicate with the image processor 1 after being ready to perform encrypted communication with the image processor 1.

The particular-data determining section 28C transmits data to the wireless LAN communication section 28D with a flag set in the data, which flag represents through which, of the normal communication section 28A and the encryption/decryption communication section 28B, data is transmitted. Further, when receiving data, the particular-data determining section 28C sorts the received data into one of the normal communication section 28A and the encryption/decryption communication section 28B, based on a flag in the received data.

The wireless LAN communication section 28D complies with the same wireless LAN standard as the standard with which the wireless LAN communication section 18D of the image processor 1 complies. The wireless LAN communication section 28D is configured to switch a communication mode of the relay transmitter 2 between the infrastructure mode and an ad hoc mode.

When switching the communication mode to the ad hoc mode, as illustrated in FIG. 1A, the relay transmitter 2 can communicate directly with the image processor 1 by establishing wireless connection with the image processor 1. Further, when switching the communication mode to the infrastructure mode, as illustrated in FIG. 1B, the relay transmitter 2 can communicate with the image processor 1 via the access point 3 by establishing wireless connection with the access point 3.

In addition, the wireless LAN communication section 28D has a physical address (MAC address) assigned thereto that is to be used for wireless communication. The physical address is stored on a non-volatile memory (not shown) incorporated in the wireless LAN communication section 28D. The physical address corresponds to the relay transmitter 2. In the embodiment, for example, the physical address for the relay transmitter 2 may be stored, as a factory default setting, on the EEPROM 14C as well.

The external-line communication unit 29 is an element which is not provided to a general MFP. The external-line communication unit 29 includes a modem 29A and a telephone line connection section 29B. The modem 29A is configured to convert one of digital data and a sound signal into the other. The telephone line connection section 29B configured to perform a communication operation (e.g., operations of making an outgoing call and receiving an incoming call) in utilizing a voice communication function or a facsimile function.

Owing to collaboration between the image processor 1 and the relay transmitter 2 configured as above, the image transmission system as a whole attains the same functions as a known MFP and a known facsimile machine. In other words, in the image transmission system, the image processor 1 serves as a portion that mainly inputs and outputs images (e.g., reads, prints, and displays images) while the relay transmitter 2 serves as a portion that mainly communicates with a destination device (e.g., the facsimile machine 5).

More specifically, when an image is transmitted using the image processor 1 and the relay transmitter 2, the image is transmitted by the wireless communication unit 18 of the image processor 1 to the wireless communication unit 28 of the relay transmitter 2 via wireless communication using a wireless LAN method. Then, the transmitted image is sent by the external-line communication unit 29 of the relay transmitter 2 to a destination device (e.g., the facsimile machine 5) via the PSTN 4.

Meanwhile, when an image is received using the image processor 1 and the relay transmitter 2, the image, transmitted by a transmitting source device (e.g., the facsimile device 5) via the PSTN 4, is received by the external-line communication unit 29 of the relay transmitter 2. Then, the received image is transmitted by the wireless communication unit 28 of the relay transmitter 2 to the wireless communication unit 18 of the image processor 1 via wireless communication using the wireless LAN method. Thereafter, the image is displayed on the display unit 11 of the image processor 1 or printed by the recording unit 16 of the image processor 1.

[Processes Executed by Image Processor and Relay Transmitter]

Figure 3:
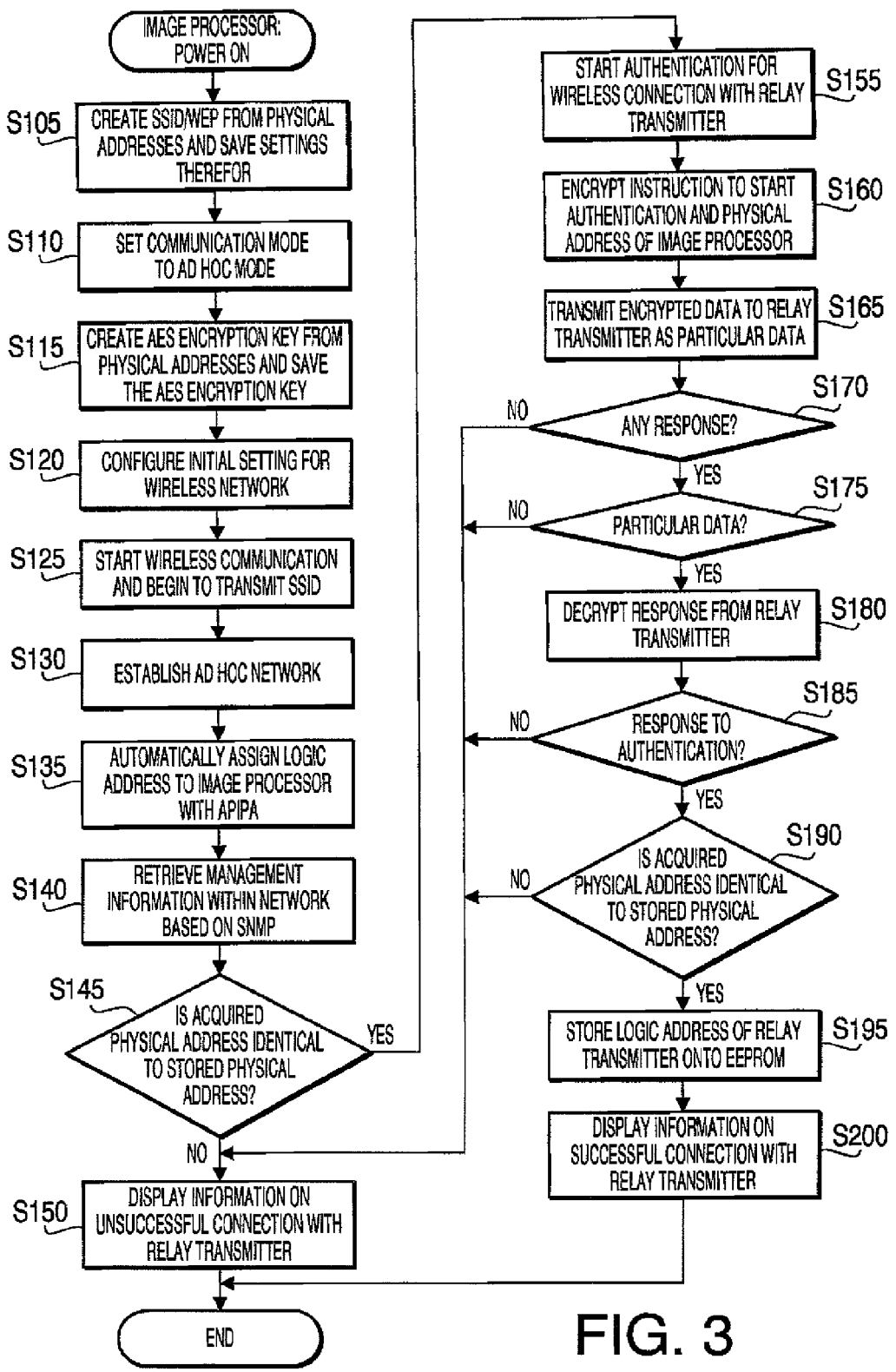
FIG. 3 is a flowchart showing a procedure of a process to be executed by the image processor in the embodiment according to one or more aspects of the present invention.
Figure 4:
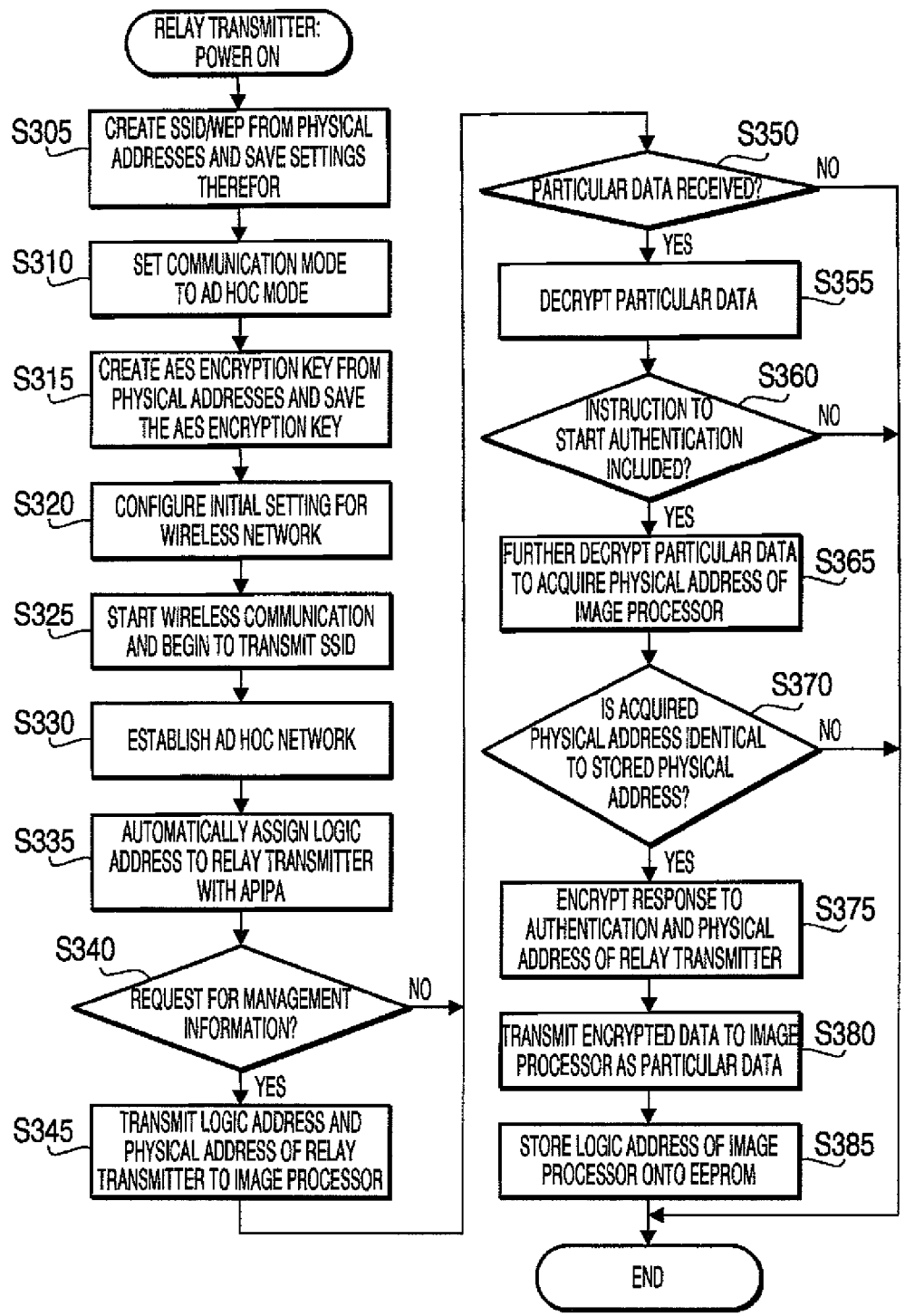
FIG. 4 is a flowchart showing a procedure of a process to be executed by the relay transmitter in the embodiment according to one or more aspects of the present invention.

Subsequently, explanations will be provided about processes to be executed by the image processor 1 and the relay transmitter 2 in order to attain the aforementioned image transmission system, with reference to FIGS. 3 and 4. It is noted that a flowchart illustrated in FIG. 3 shows major ones of steps to be executed by the image processor 1. It is noted that a flowchart illustrated in FIG. 4 shows major ones of steps to be executed by the relay transmitter 2.

When the image processor 1 is powered on, the CPU 10 of the image processor 1 begins to execute a process shown in FIG. 3. When starting the process, the CPU 10 creates a service set identifier (SSID) and a wired equivalent privacy (WEP) from the physical addresses (MAC addresses), and saves settings therefor (S105). Then, the CPU 10 sets the communication mode of the wireless communication unit 18 to the ad hoc mode (S110).

The SSID created in D105 is an identifier corresponding to a network name of a wireless network established between the image processor 1 and the relay transmitter 2. Further, the WEP created in S105 is one of encryption standards for a wireless LAN that employs a common key encryption method.

In the embodiment, both the SSID and the WEP are created based on the physical address for the image processor 1 and the physical address for the relay transmitter 2. The physical address for the image processor 1 is read out of the non-volatile memory inside the wireless LAN communication section 18D. Additionally, the physical address for the relay transmitter 2 is read out of the EEPROM 14C, which has the physical address for the relay transmitter 2 stored thereon, e.g., as a factory default setting. It is noted that the physical address for the relay transmitter 2 may be stored on the EEPROM 14C before supplied to the user after set in some way (e.g., by a service person).

In the embodiment, each of the two physical addresses has 12 digits in a hexadecimal form. It is assumed that the physical address for the image processor 1 is expressed with "ZYXWVUTSRQPO" (it is noted that each of the twelve symbols "Z" to "O" for the twelve digits is any of values "0" to "f" for representing each digit of a hexadecimal number) and the physical address for the relay transmitter 2 is expressed with "ABCDEFGHIJKL" (it is noted that the twelve symbols "A" to "L" for the twelve digits are any of the values "0" to "f" for representing each digit of a hexadecimal number). Under such an assumption, in S105, the CPU 10 extracts the last six digits from each of the two physical addresses and determines, as the SSID, a hexadecimal number of twelve digits created by rearranging the respective twelve values for the extracted twelve digits in an order "GTHSIRJQKPLO." Further, the CPU 10 determines, as the WEP, a hexadecimal number of thirteen digits created by rearranging the respective twelve values for the extracted twelve digits in an order "LOKPJQIRHSGTG."

It is noted that the above "GTHSIRJQKPLO" and "LOKPJQIRHSGTG" are just examples of the rearrangement orders of the respective values for the extracted twelve digits in creating the SSID and the WEP. The arrangement orders or the digits to be extracted may be changed. In this respect, however, the image processor 1 and the relay transmitter 2 are required to apply an identical rearrangement order for the SSID and an identical rearrangement order for the WEP under a common rule between the image processor 1 and the relay transmitter 2.

Next, the CPU 10 creates an advanced encryption standard (AES) encryption key from the physical addresses, and saves the AES encryption key (S115). The AES is one of common key encryption methods. In S115, the CPU 10 extracts twelve digits from each of the two physical addresses, and determines, as the AES encryption key, a hexadecimal number of 24 digits created by rearranging the respective 24 values for the extracted 24 digits in an order "AZBYCXDWEVFUGTHSIRJQKPLO."

After creating the AES encryption key determined as above (S115), the CPU 10 configures an initial setting concerning the wireless network (S120). Then, to start wireless communication, the CPU 10 begins to transmit the SSID (S125). After that, the CPU 10 establishes an ad hoc network with the relay transmitter 2 (S130). Thereafter, the CPU 10 automatically assigns thereto (to the image processor 1) a logic address (IP address) using automatic private IP addressing (APIPA) (S135). The APIPA is a function that causes a device, having the function, to retrieve an unused IP address on a network of the device and to assign the unused IP address to the device when there is not on the network an external device (e.g., a DHCP server) having a function to assign an IP address to the device.

After the logic address is completely assigned in S135, the CPU 10 retrieves management information within the network based on a simple network management protocol (SNMP) (S140). When a response to the retrieving operation in S140 is transmitted by the relay transmitter 2, the CPU 10 receives the response and acquires a "physical address for the relay transmitter 2" included in the response. Then, the CPU 10 determines whether the acquired "physical address for the relay transmitter 2" is identical to the "physical address for the relay transmitter 2" stored on the EEPROM 14C, by comparing both the physical addresses with each other (S145).

When determining that both the physical addresses are not identical to each other (S145: No), the CPU 10 displays on the display unit 11 information on the unsuccessful connection with the relay transmitter 2 (S150). After that, the CPU 10 terminates the present process shown in FIG. 3. Meanwhile, when determining that both the physical addresses are identical to each other (S145: Yes), the CPU 10 cannot definitely determine yet at this stage whether the response has been transmitted by the relay transmitter 2 or another wireless communication device that masquerades as the relay transmitter 2.

Therefore, the CPU 10 starts authentication to establish wireless connection with the relay transmitter 2 (S155). The CPU 10 controls the encryption/decryption communication section 18B to encrypt an instruction to start the authentication and the physical address for the image processor 1 with the AES encryption key (S160). Then, the CPU 10 controls the particular-data determining section 18C to add the flag to the encrypted data and transmit the encrypted data with the flag set therein to the relay transmitter 2 as particular data (S165).

When a response to the particular data (the instruction to start the authentication) transmitted in S165 is returned by the relay transmitter 2 (S170: Yes), the CPU 10 determines whether the response is particular data (S175). It is noted that when the response is proper, the response should be particular data encrypted with the AES encryption key.

When determining that the response is particular data (S175: Yes), the CPU 10 controls the encryption/decryption communication section 18B to decrypt the encrypted data (i.e., the response from the relay transmitter 2) with AES encryption key (S180). Then, the CPU 10 determines whether the decrypted data is a response to (the instruction to start) the authentication from the relay transmitter 2 (S185).

When determining that the decrypted data is a response to the authentication from the relay transmitter 2 (S185: Yes), the CPU 10 determines whether a "physical address for the relay transmitter 2" included in the response is identical to the "physical address for the relay transmitter 2" stored on the EEPROM 14C, by comparing both the physical addresses (S190).

When determining that both the physical addresses are identical to each other (S190: Yes), the CPU 10 stores the logic address of the relay transmitter 2 onto the EEPROM 14C (S195), and displays on the display unit 11 information on the successful connection with the relay transmitter 2 (S200). After that, the CPU 10 terminates the present process shown in FIG. 3.

When no response to the particular data transmitted in S165 is returned by the relay transmitter 2 (S170: No), or a response transmitted by the relay transmitter 2 is not particular data (S175: No), or both the physical addresses are not identical to each other (S190: No), the CPU 10 goes to S150, in which the CPU 10 displays on the display unit 11 information that the image processor 1 is not successfully connected with the relay transmitter 2 (S150). Thereafter, the CPU 10 terminates the present process shown in FIG. 3.

In parallel with the aforementioned process being executed by the image processor 1, the relay transmitter 2 performs a process shown in FIG. 4. In other words, when the relay transmitter 2 is powered on, the CPU 20 of the relay transmitter 2 starts the process shown in FIG. 4. Among the steps shown in FIG. 4, S305 to S335 are substantially the same as S105 to S135 executed by the image processor 1, respectively.

Specifically, the CPU 20 first creates an SSID and an WEP from the physical addresses (MAC addresses), and saves settings therefor (S305). Then, the CPU 20 sets the communication mode of the wireless communication unit 28 to the ad hoc mode (S310). It is noted that the SSID and the WEP are the same as those created in S105.

Subsequently, the CPU 20 creates an AES encryption key from the physical addresses, and saves the AES encryption key (S315). The AES encryption key created in S315 is the same as that created in S115.

After creating the AES encryption key (S315), the CPU 20 configures an initial setting concerning the wireless network (S320). Then, to start wireless communication, the CPU 20 begins to transmit the SSID (S325). After that, the CPU 20 establishes an ad hoc network with the image processor 1 (S330). Thereafter, the CPU 20 automatically assigns thereto a logic address (IP address) using the APIPA (S335).

After the logic address is completely assigned in S335, the CPU 20 determines whether the CPU 20 has received a request for management information (S340). Here, when the image processor 1 performs the aforementioned step S140, the CPU 20 determines in S340 that the CPU 20 has received a request for management information (S340: Yes). In that case, the CPU 20 transmits, to the image processor 1, a response that includes information regarding the logic address and the physical address for the relay transmitter 2 (S345). The response transmitted in S345 is the aforementioned response that includes the information (i.e., the physical address for the relay transmitter 2) to be compared with the physical address for the relay transmitter 2 stored on the EEPROM 14C in S145. After execution of S345, the CPU 20 goes to S350. Meanwhile, when determining in S340 that the CPU 20 has not received a request for management information (S340: No), the CPU 20 goes to S350 without executing S345.

In S350, the CPU 20 determines whether the CPU 20 has received particular data from the image processor 1 (S350). It is noted that the particular data, which the CPU 20 determines in S350 whether the CPU 20 has received, is transmitted in the aforementioned step S165.

When determining that the CPU 20 has received particular data from the image processor 1 (S350: Yes), the CPU 20 controls the encryption/decryption communication section 28B to decrypt the particular data with the AES encryption key (S355). Thereafter, the CPU 20 determines whether the particular data includes the instruction to start the authentication (S360).

When determining that the particular data includes the instruction to start the authentication (S360: Yes), the CPU 20 further decrypts the received particular data to acquire a physical address (S365). Then, the CPU 20 compares the acquired "physical address for the image processor 1" with the "physical address for the image processor 1" stored on the EEPROM 24C, and determines whether both the physical addresses are identical to each other (S370).

When determining that both the physical addresses are identical to each other (S370: Yes), the CPU 20 controls the encryption/decryption communication section 28B to encrypt a response to (the instruction to start) the authentication and the physical address of the relay transmitter 2 with the AES encryption key (S375). Then, the CPU 20 controls the particular-data determining section 28C to add the flag to the encrypted data and transmit the encrypted data with the flag set therein to the image processor 1 as particular data (S380).

Subsequently, the CPU 20 stores the logic address of the image processor 1 onto the EEPROM 24C (S385). Thereafter, the CPU 20 terminates the process shown in FIG. 4. Meanwhile, when the CPU 20 has not received particular data from the image processor 1 (S350: No), or the received particular data does not include the instruction to start the authentication (S360: No), or both the physical addresses are not identical to each other (S370: No), the CPU 20 terminates the process shown in FIG. 4.

Figure 5:
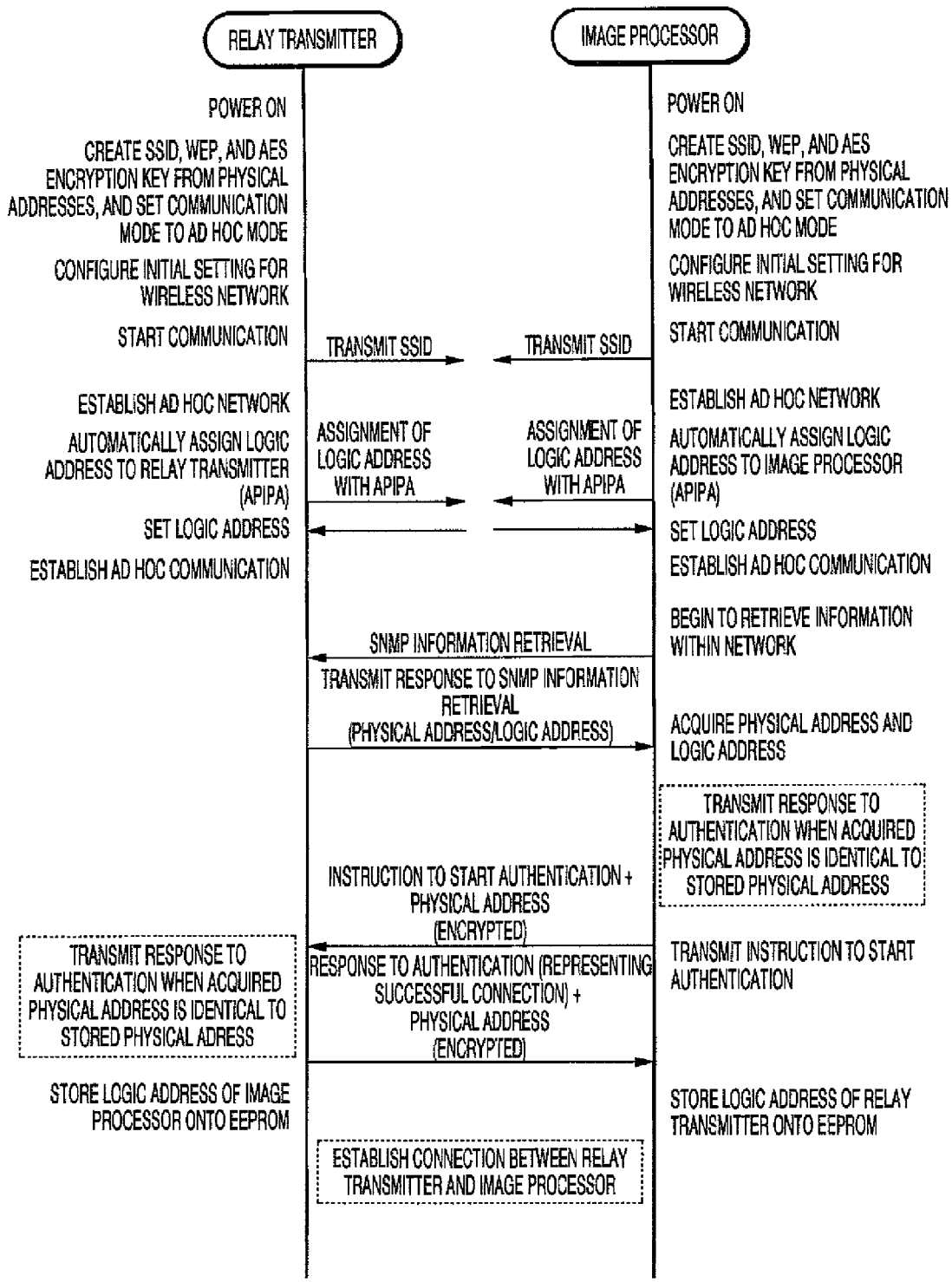
FIG. 5 is a sequence diagram showing in sequence respective states of the image processor and the relay transmitter until wireless connection is established therebetween in the embodiment according to one or more aspects of the present invention.

As described above, when the image processor 1 performs the process shown in FIG. 3 and the relay transmitter 2 performs the process shown in FIG. 4, communication is established and performed between the image processor 1 and the relay transmitter 2, e.g., in accordance with a procedure as illustrated in a sequence diagram of FIG. 5.

Namely, the image processor 1 performs the steps S105 to S135 in response to the image processor 1 being powered on, so as to create the SSID, the WEP, and the AES encryption key from the physical addresses for both the image processor 1 and the relay transmitter 2 and establish communication environments for wireless communication in the ad hoc mode. In the same manner, the relay transmitter 2 performs the steps S305 to S335 in response to the relay transmitter 2 being powered on, so as to create the SSID, the WEP, and the AES encryption key from the physical addresses for both the image processor 1 and the relay transmitter 2 and establish communication environments for wireless communication in the ad hoc mode.

Then, when the ad hoc communication is established, the image processor 1 retrieves management information within the network based on the SNMP in S140. In response to the retrieving operation, the relay transmitter 2 transmits to the image processor 1 the physical address and the logic address for the relay transmitter 2 in S345. It is noted that by this time, an encrypting operation with the AES encryption key has not yet been performed.

After the aforementioned communication, the image processor 1 recognizes a device which may be the relay transmitter 2. Therefore, subsequently in S155 to S165, the image processor 1 transmits, to the relay transmitter 2, the instruction to start the authentication along with the physical address of the image processor 1 in an encrypted manner. In response to receipt of the instruction, the relay transmitter 2 transmits the response to the authentication along with the physical address of the relay transmitter 2 in an encrypted manner in S375 to S380. Thereby, both the image processor 1 and the relay transmitter 2 recognize each other as a device with which communication can be performed using a common encryption key, and thus determine each other to be a proper device with which communication is to be established. Then, both the image processor 1 and the relay transmitter 2 register their logic addresses onto the EEPROM 14C and the EEPROM 24C, respectively. After that, encrypted communication can be achieved between the image processor 1 and the relay transmitter 2.

[Effects]

As described above, according to the image transmission system including the image processor 1 and the relay transmitter 2, it is possible to certainly establish wireless connection between the image processor 1 and the relay transmitter 2 by turning on the image processor 1 and the relay transmitter 2. Thereby, the image transmission system is set to be able to perform facsimile communication. Further, even though one or more other wireless communication devices are present near the image processor 1 and the relay transmitter 2 when the image processor 1 and the relay transmitter 2 are powered on, the image processor 1 and the relay transmitter 2 authenticate each other with the physical address of each other. Hence, each of the image processor 1 and the relay transmitter 2 does not establish wireless connection with a device other than the image processor 1 and the relay transmitter 2. Thus, it is possible to prevent any of the image processor 1 and the relay transmitter 2 from establishing wireless connection with an undesired device.

Further, according to the aforementioned image transmission system, each of the image processor 1 and the relay transmitter 2 stores the physical addresses of both the image processor 1 and the relay transmitter 2, and creates the same network name based on the two physical addresses. Then, by using the same network name created, each of the image processor 1 and the relay transmitter 2 serves as a node of the same wireless network and performs wireless communication. Accordingly, even though another wireless network is present near the image processor 1 and the relay transmitter 2, another wireless communication device can hardly use the same network name. In addition, even though a different device (an image processor or a relay transmitter) of the same type as the image processor 1 or the relay transmitter 2 is present near the image processor 1 and the relay transmitter 2 when the image processor 1 and the relay transmitter 2 establish wireless connection therebetween, it is possible to establish a wireless network of a network name that is different from a network name of a network of the different device. Thus, it is possible to enhance the effect to prevent any of the image processor 1 and the relay transmitter 2 from establishing wireless connection with an undesired device.

Further, according to the aforementioned image transmission system, each of the image processor 1 and the relay transmitter 2 stores the physical addresses of both the image processor 1 and the relay transmitter 2, and creates the same encryption key based on the two physical addresses. Then, by using the same encryption key created, each of the image processor 1 and the relay transmitter 2 performs the same encrypted communication in the same encryption method. Accordingly, when the image processor 1 and the relay transmitter 2 perform wireless communication therebetween, a third party, who does not know the physical addresses of the image processor 1 and the relay transmitter 2, can hardly decrypt encrypted data. Thus, it is possible to transmit and receive confidential data between the image processor 1 and the relay transmitter 2.

In addition, according to the aforementioned image transmission system, when authentication is established between the image processor 1 and the relay transmitter 2, an encryption key usable only therebetween is used for encrypted communication therebetween. In the meantime, the image processor 1 is configured to communicate with the wireless communication device 6 other than the relay transmitter 2. However, in this situation, the image processor 1 performs wireless communication with the wireless communication device 6 without using the encryption key created for the communication with the relay transmitter 2. Accordingly, even though communication is performed between the image processor 1 and the relay transmitter 2, the wireless communication device 6 cannot decrypt data exchanged between the image processor 1 and the relay transmitter 2. Thus, it is possible to exchange highly confidential data between the image processor 1 and the relay transmitter 2. Additionally, the image processor 1 can establish wireless connection with the wireless communication device 6 which cannot recognize the encryption key created in the image processor 1 and the relay transmitter 2. Therefore, another device such as the wireless communication device 6 can easily utilize the image processor 1.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the image transmission system is exemplified which is configured to perform facsimile communication (i.e., to transmit and receive facsimile data). However, aspects of the present invention may be applied to an image transmission system configured just for transmitting facsimile data or an image transmission system configured just for receiving facsimile data.

In the aforementioned embodiment, the image processor 1 and the relay transmitter 2 authenticate each other as a target device with which wireless connection is to be established, using the physical address of each other. Further, the image processor 1 and the relay transmitter 2 create the same network name and the same encryption key. Nevertheless, the network name and the encryption key may not necessarily be associated with the physical addresses for the image processor 1 and the relay transmitter 2. In this respect, however, when the network name and the encryption key are created in association with the physical addresses for the image processor 1 and the relay transmitter 2 as exemplified in the aforementioned embodiment, the image transmission system can handle more highly confidential information that would hardly be decrypted by any other wireless communication device.

What is claimed is:

1. A data processor configured to perform data communication with an external device via wireless communication with a relay transmitter, the data processor comprising:
   a communication unit configured to perform wireless communication with the relay transmitter;

a storage unit configured to store a first physical address for the relay transmitter;

an authentication starter configured to, in response to the data processor being turned on, wirelessly transmit, to the relay transmitter, an instruction to start authentication between the data processor and the relay transmitter along with a physical address for the data processor;

an address receiver configured to receive a second physical address for the relay transmitter wirelessly transmitted from the relay transmitter as a response to the instruction;

a determining unit configured to make a determination as to whether the second physical address for the relay transmitter which is received from the relay transmitter wirelessly is identical to the first physical address for the relay transmitter which had been stored in the storage unit before the data processor is turned on; and a connecting unit configured to, when one or more authentication requirements are satisfied, establish wireless connection between the communication unit and the relay transmitter so as to achieve the data communication between the data processor and the external device via the relay transmitter, the authentication requirements including the determination by the determining unit that the second physical address for the relay transmitter is identical to the first physical address for the relay transmitter.

2. The data processor according to claim 1, wherein the address receiver is configured to receive, from the relay transmitter, the second physical address for the relay transmitter after the data processor is turned on in a state where the first physical address for the relay transmitter is stored on the storage unit.

3. The data processor according to claim 1, further comprising an image acquiring unit configured to acquire an image, wherein the communication unit comprises an image transmitter configured to transmit the image acquired by the image acquiring unit.

4. The data processor according to claim 1, wherein the communication unit comprises an image receiver configured to receive an image from the external device via wireless communication with the relay transmitter, and wherein the data processor further comprises an image outputting unit configured to output the image received by the image receiver.

5. The data processor according to claim 1, further comprising a network name creating unit configured to create a network name for a wireless network containing thereon the data processor and the relay transmitter, based on the physical address for the data processor and the first physical address for the relay transmitter, such that the created network name is identical to a network name created by the relay transmitter for the wireless network, wherein the communication unit is configured to perform wireless communication with the relay transmitter based on the network name created by the network name creating unit.

6. The data processor according to claim 1, further comprising an encryption key creating unit configured to create an encryption key based on the physical address for the data processor and the first physical address for the relay transmitter, such that the created encryption key is identical to an encryption key created by the relay transmitter, wherein the communication unit is configured to perform encrypted wireless communication with the relay transmitter using the encryption key created by the encryption key creating unit.

7. The data processor according to claim 6, wherein the communication unit is configured to perform wireless communication with a wireless communication device other than the relay transmitter in any of a direct manner and an indirect manner via an access point, wherein the communication unit determines whether to communicate with the relay transmitter or the other wireless communication device, wherein when determining that the communication unit is to communicate with the relay transmitter, the communication unit performs encrypted communication with the relay transmitter, wherein when determining that the communication unit is to communicate with the relay transmitter, the communication unit performs the encrypted wireless communication with the relay transmitter using the encryption key created by the encryption key creating unit, and wherein when determining that the communication unit is to communicate with the other wireless communication device, the communication unit performs wireless communication with the other wireless communication device without using the encryption key.

8. A relay transmitter comprising:

first communication unit configured to perform wireless communication with a data processor;

a second communication unit configured to perform data communication with an external device;

a storage unit configured to store a first physical address for the data processor;

an address receiver configured to, in response to the relay transmitter being turned on, wirelessly receive, from the data processor, a second physical address for the data processor along with an instruction to start authentication between the data processor and the relay transmitter;

a determining unit configured to, in response to the instruction which is received wirelessly from the data processor, make a determination as to whether the second physical address for the data processor is identical to the first physical address for the data processor which had been stored in the storage unit before the relay transmitter is turned on; and a connecting unit configured to, when one or more authentication requirements are satisfied, wirelessly transmit a physical address for the relay transmitter to the data processor and establish wireless connection between the first communication unit and the data processor so as to achieve data communication between the data processor and the external device via the relay transmitter, the authentication requirements including the determination by the determining unit that the second physical address for the data processor is identical to the first physical address for the data processor.

9. The relay transmitter according to claim 8, wherein the address receiver is configured to receive, from the data processor, the second physical address for the data processor after the relay transmitter is turned on in a state where the first physical address for the data processor is stored on the storage unit.

10. The relay transmitter according to claim 8, wherein the first communication unit comprises a first receiving unit configured to receive an image from the data processor via wireless communication, and wherein the second communication unit comprises a first transmitting unit configured to transmit the image received by the first receiving unit, to the external device via facsimile communication.

11. The relay transmitter according to claim 8,
wherein the second communication unit comprises a second receiving unit configured to receive an image from the external device via facsimile communication, and
wherein the first communication unit comprises a second transmitting unit configured to transmit the image received by the second receiving unit, to the data processor via wireless communication.

12. The relay transmitter according to claim 8, further comprising a network name creating unit configured to create a network name for a wireless network containing thereon the data processor and the relay transmitter, based on the physical address for the relay transmitter and the first physical address for the data processor, such that the created network name is identical to a network name created by the data processor for the wireless network,
wherein the first communication unit is configured to perform wireless communication with the data processor based on the network name created by the network name creating unit.

13. The relay transmitter according to claim 8, further comprising an encryption key creating unit configured to create an encryption key based on the physical address for the relay transmitter and the first physical address for the data processor, such that the created encryption key is identical to an encryption key created by the data processor,
wherein the first communication unit is configured to perform encrypted wireless communication with the data processor using the encryption key created by the encryption key creating unit.

14. A data transmission system comprising:
a relay transmitter configured to perform data communication with an external device; and
a data processor configured to perform data communication with the external device via wireless communication with the relay transmitter,
wherein the data processor comprises:
a communication unit configured to perform wireless communication with the relay transmitter;
a storage unit configured to store a first physical address for the relay transmitter;
an authentication starter configured to, in response to the data processor being turned on, wirelessly transmit, to the relay transmitter, an instruction to start authentication between the data processor and the relay transmitter along with a physical address for the data processor;
an address receiver configured to receive a second physical address for the relay transmitter wirelessly transmitted from the relay transmitter as a response to the instruction;
a determining unit configured to make a determination as to whether the second physical address for the relay transmitter which is received from the relay transmitter wirelessly is identical to the first physical address for the relay transmitter which had been stored in the storage unit before the data processor is turned on; and
a connecting unit configured to, when one or more authentication requirements are satisfied, establish wireless connection between the communication unit and the relay transmitter so as to achieve the data communication between the data processor and the external device via the relay transmitter, the authentication requirements including the determination by the determining unit that the second physical address for the relay transmitter is identical to the first physical address for the relay transmitter, and wherein the relay transmitter comprises:
a first relay-transmitter-side communication unit configured to perform wireless communication with the data processor;
a second relay-transmitter-side communication unit configured to perform data communication with the external device;
a relay-transmitter-side storage unit configured to store a first physical address for the data processor;
a relay-transmitter-side address receiver configured to, in response to the relay transmitter being turned on, wirelessly receive, from the data processor, a second physical address for the data processor along with the instruction to start authentication between the data processor and the relay transmitter;
a relay-transmitter-side determining unit configured to, in response to the instruction which is received wirelessly from the data processor, make a determination as to whether the second physical address for the data processor is identical to the first physical address for the data processor which had been stored in the storage unit before the relay transmitter is turned on; and
a relay-transmitter-side connecting unit configured to, when the authentication requirements are satisfied, wirelessly transmit a physical address for the relay transmitter to the data processor and establish wireless connection between the first communication unit and the data processor so as to achieve the data communication between the data processor and the external device via the relay transmitter, the authentication requirements including the determination by the relay-transmitter-side determining unit that the second physical address for the data processor is identical to the first physical address for the data processor.

15. The data transmission system according to claim 14,
wherein the address receiver is configured to receive, from the relay transmitter, the second physical address for the relay transmitter after the data processor is turned on in a state where the first physical address for the relay transmitter is stored on the storage unit, and
wherein the relay-transmitter-side address receiver is configured to receive, from the data processor, the second physical address for the data processor after the relay transmitter is turned on in a state where the first physical address for the data processor is stored on the storage unit.

16. The data transmission system according to claim 14,
wherein the data processor further comprises an image acquiring unit configured to acquire an image,
wherein the communication unit comprises an image transmitter configured to transmit the image acquired by the image acquiring unit,
wherein the first relay-transmitter-side communication unit comprises a first receiving unit configured to receive the image from the data processor via wireless communication, and
wherein the second relay-transmitter-side communication unit comprises a first transmitting unit configured to transmit the image received by the first receiving unit, to the external device via facsimile communication.

17. The data transmission system according to claim 14,
wherein the second relay-transmitter-side communication unit comprises a second receiving unit configured to receive an image from the external device via facsimile communication,
wherein the first relay-transmitter-side communication unit comprises a second transmitting unit configured to transmit the image received by the second receiving unit, to the data processor via wireless communication,
wherein the communication unit comprises an image receiver configured to receive the image from the external device via wireless communication with the relay transmitter, and
wherein the data processor further comprises an image outputting unit configured to output the image received by the image receiver.

18. The data transmission system according to claim 14,
wherein the data processor further comprises a network name creating unit configured to create a network name for a wireless network containing thereon the data processor and the relay transmitter, based on a physical address for the data processor and the first physical address for the relay transmitter, such that the created network name is identical to a network name created by the relay transmitter for the wireless network,
wherein the communication unit is configured to perform wireless communication with the relay transmitter based on the network name created by the network name creating unit,
wherein the relay transmitter further comprises a relay-transmitter-side network name creating unit configured to create a network name for the wireless network containing thereon the data processor and the relay transmitter, based on the physical address for the relay transmitter and the first physical address for the data processor, such that the created network name is identical to the network name created by the data processor for the wireless network, and
wherein the first relay-transmitter-side communication unit is configured to perform wireless communication with the data processor based on the network name created by the network name creating unit.

19. The data transmission system according to claim 14,
wherein the data processor further comprises an encryption key creating unit configured to create an encryption key based on the physical address for the data processor and the first physical address for the relay transmitter, such that the created encryption key is identical to an encryption key created by the relay transmitter,
wherein the communication unit is configured to perform encrypted wireless communication with the relay transmitter using the encryption key created by the encryption key creating unit,
wherein the relay transmitter further comprises a relay-transmitter-side encryption key creating unit configured to create an encryption key based on the physical address for the relay transmitter and the first physical address for the data processor, such that the created encryption key is identical to the encryption key created by the data processor, and
wherein the first relay-transmitter-side communication unit is configured to perform encrypted wireless communication with the data processor using the encryption key created by the relay-transmitter-side encryption key creating unit.

20. The data transmission system according to claim 19,
wherein the communication unit is configured to perform wireless communication with a wireless communication device other than the relay transmitter in any of a direct manner and an indirect manner via an access point,
wherein the communication unit determines whether to communicate with the relay transmitter or the other wireless communication device,
wherein when determining that the communication unit is to communicate with the relay transmitter, the communication unit performs encrypted communication with the relay transmitter,
wherein when determining that the communication unit is to communicate with the relay transmitter, the communication unit performs the encrypted wireless communication with the relay transmitter using the encryption key created by the encryption key creating unit, and
wherein when determining that the communication unit is to communicate with the other wireless communication device, the communication unit performs wireless communication with the other wireless communication device without using the encryption key.

* * * * *